Nov. 12, 1968   J. L. ABERNATHY   3,411,151
DISPLAY UNIT

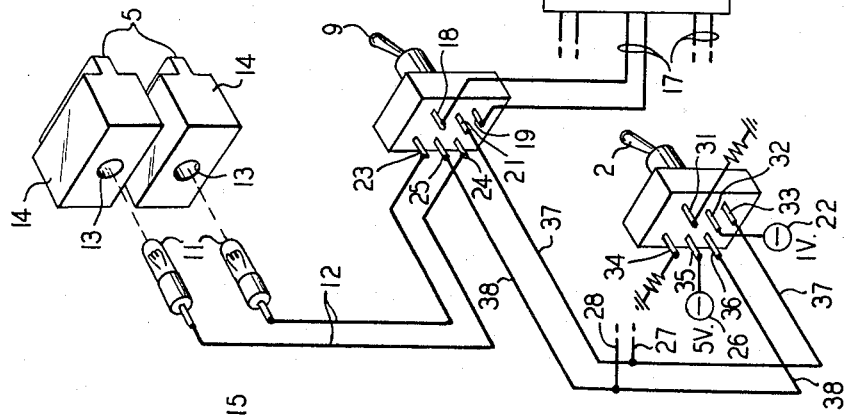
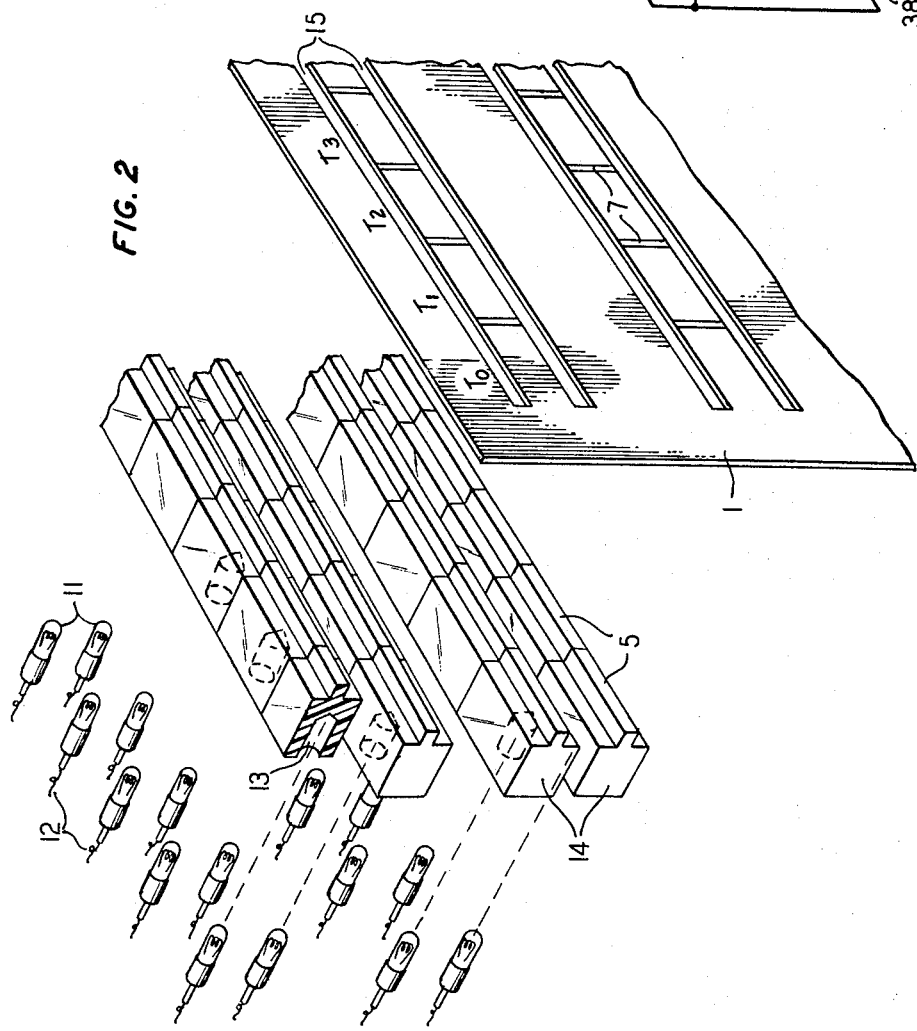

Filed March 10, 1966   4 Sheets-Sheet 3

United States Patent Office 3,411,151
Patented Nov. 12, 1968

3,411,151
DISPLAY UNIT
John L. Abernathy, Burlington, N.C., assignor to Bell Telephone Laboratories, Incorporated, New York, N.Y., a corporation of New York
Filed Mar. 10, 1966, Ser. No. 533,319
14 Claims. (Cl. 340—225)

This invention relates to display units and, more particularly, to a display unit for providing statistic representations of dynamically generated rectangular electric waves. The invention is especially useful for providing illuminated pictorial representations of the logic levels of multiple and repetitive rectangular waveforms dynamically produced by a multisource pulse generators.

In designing and fabricating digital equipment it is desirable to test the equipment by connecting it to a multiplicity of signal sources with each source generating a changeable complexity of rectangular pulses in some repetitive time interval. These multiple signal sources can be provided by a multisource pulse generator having a large number of control means for determining the variable widths and interpulse spacings of the pulses generated by each source during an assigned time interval. With this large number of different waveforms being generated simultaneously, it is desirable to have some means for assisting an operator to visualize the specific nature of each waveform.

Accordingly, it is an object of this invention to provide static visual representations of dynamically generated rectangular electric waves.

Another object of this invention is to provide a static pictorial display of the complete cycle of each waveform produced by a multisource pulse generator.

These and other objects of the invention are attained by employing a display unit having a panel so constructed and arranged as to provide a pictorial representation of each waveform. The representation of each waveform is displayed horizontally with each display being displaced vertically from the others. Specifically, the display unit comprises a panel having a number of pairs of parallel rows of horizontally disposed indicia. Interposed between the rows of each of these pairs is a representively different row of vertically disposed indicia. Each of the horizontal and vertical indicia have narrow rectangular faces. The horizontal indicia are adapted to be selectively illuminated individually by control circuits associated with a multisource pulse generator. Illumination of the horizonal indicia combines with the vertical indicia to create pictorial representations of the rectangular waves produced by the pulse generator.

In a modified form of the display unit, the vertical indicia are also selectively illuminated so that the panel presents a number of series of illuminated lines simulating the shapes of the waves produced by the multisource pulse generator. In this modified form of the invention, the horizontal indicia are in the form of pushbuttons and perform the additional function of controlling the operation of the multisource pulse generator.

These and other features of the invention are more fully discussed in connection with the following detailed description of the drawing, in which:

FIG. 2 is an exploded perspective view of some of the component elements of the display unit;

FIG. 3 is a schematic diagram of the electric connections between a multisource pulse generator and one of its control instrumentalities and the particular associated elements of the display unit;

Figure 1:
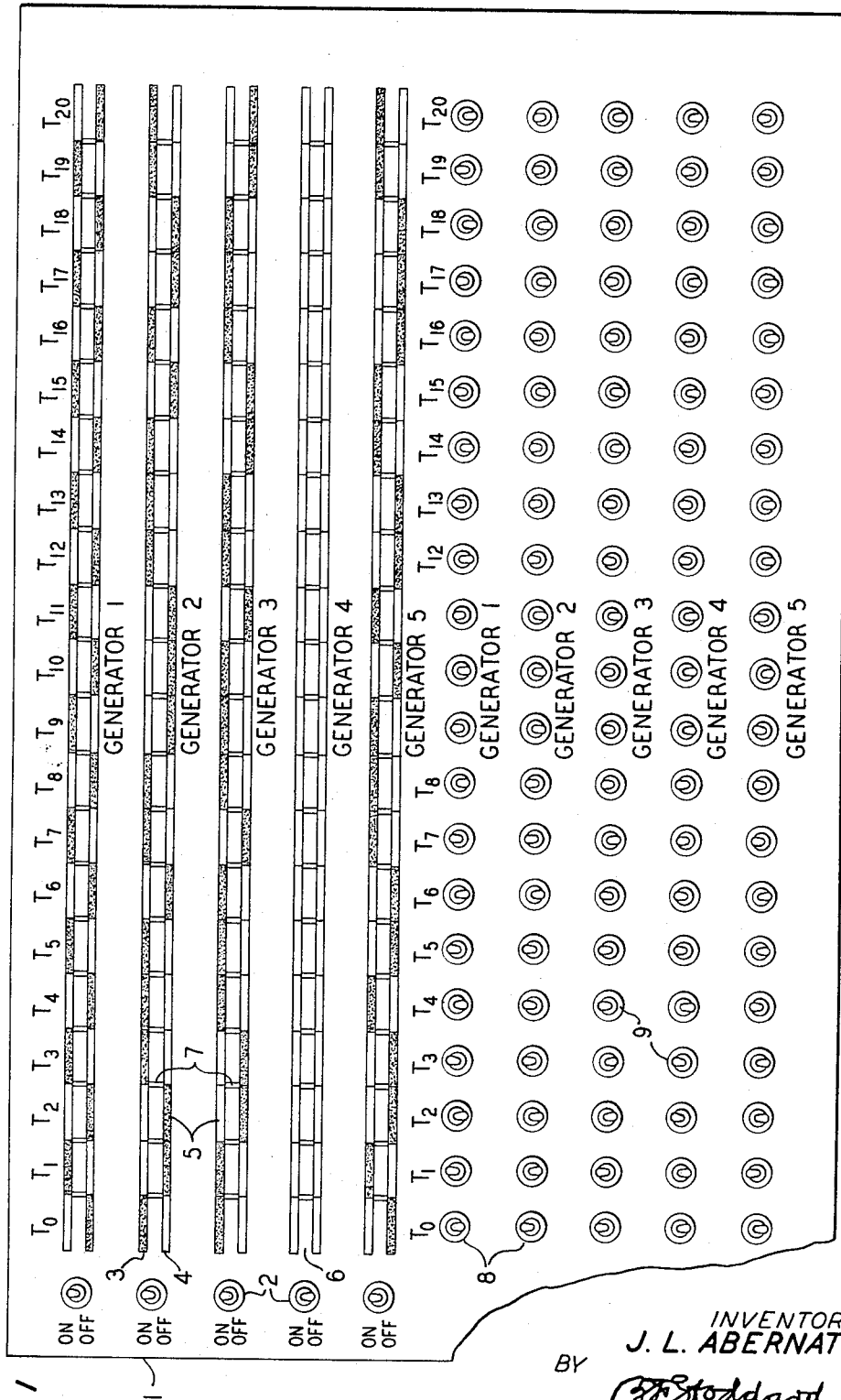
FIG. 1 is a front view of a display unit in accordance with this invention together with control instrumentalities for determining the operation of a multisource pulse generator.

In FIG. 1, a display unit in accordance with this invention is represented as comprising a panel 1 having near its upper left edge a column of five toggle switches 2 which control the on-off condition of respectively different sources in a mutisource pulse generator. Adjacent to each of the toggle switches 2 is a respectively associated pair of rows 3 and 4 of horizontally disposed indicia 5 which are adapted to be selectively illuminated by means described hereinafter. Interposed between the rows 3 and 4 of each pair is a row 6 of vertically disposed indicia 7 which are colored white.

Below each pair of rows 3 and 4, a legend is marked in the middle of the panel 1 for indicating the particular pulse generator source associated therewith. Thus, the legend for the top pair of rows 3 and 4 is "GENERATOR 1" and the legend for the bottom pair of rows 3 and 4 is "GENERATOR 5." It is to be understood that the panel 1 may be used with a different number than five generators. If it is a smaller number, then certain of the switches 2 and their associated indicia rows 3, 4, and 6 would not be utilized. If it is a larger number, then the panel 1 would be provided with a correspondingly larger number of toggle switches 2 and associated indicia rows 3, 4, and 6.

Across the top portion of the panel 1 is a series of time units indicia "$T_0$" to "$T_{20}$." Each of these is associated with a respectively different column of the horizontal indicia 5 and represents a particular unit of a repetitive time interval. For shorter time intervals, certain of the columns would not be used, and for longer time intervals more columns would be provided on the panel 1.

The lower portion of the panel 1 is provided with five rows 8 each containing a number of toggle switches 9 which are connected to pulse forming means in a multisource pulse generator. Each row 8 is identified by a different legend "GENERATOR 1" to "GENERATOR 5." Each column of the toggle switches 9 is identified by a respectively different legend "$T_0$" to "$T_{20}$." As was the case above, when a smaller number than five generators is used, certain of the rows 8 of toggle switches 9 would not be utilized, but, if a larger number of generators was required, then a correspondingly larger number of rows 8 of toggle switches 9 would be provided. Similarly, if a shorter time interval is desired, certain of the columns of toggle switches 9 would not be used, but, if a longer time interval is needed, then more columns of toggle switches 9 would be provided.

Before proceeding further with the description of the apparatus of this invention, the operation of the above-described equipment will now be explained briefly. An operator or programmer manually manipulates the toggle switches 2 at the upper left side of the panel 1 for turning on the desired generation sources in the associated multisource pulse generator. The operator then manipulates the toggle switches 9 for controlling the pulse forming means associated with the sources that have been turned on in the pulse generator thereby determining the width and interpulse spacings of the pulses generated by each of these sources during the assigned repetitive time interval. Operation of the toggle switches 9 to their upper positions causes, by means described hereinafter, associated horizontal indicia 5 in row 3 to become illuminated while operation of the toggle switches 9 to their lower positions causes the associated indicia 5 in row 4 to be illuminated. Thus, those of the indicia 5 which have been illuminated combine with the white indicia 7 to provide static pictorial representations of the logic levels of the rectangular waveforms which are being dynamically produced repetitively by the multisource pulse generator.

The construction of the indicia portion of the panel 1 will now be explained with reference to FIG. 2 which is an exploded perspective view of the upper left portion of the panel 1. For purposes of simplicity the on-off toggle switches 2 have been omitted from FIG. 2. The upper left portion of FIG. 2 shows a number of lamps 11 with their energizing electric leads 12. These lamps 11 are adapted to be inserted into sockets 13 which are formed in a plurality of lenses 14. Each lens 14 has only one socket 13 for receiving and holding one lamp 11. These lenses 14 are made of suitable translucent material, such as an appropriate plastic, and are shaped in the form of bocks with projecting narrow rectangular faces which constitute the indicia 5 shown in FIG. 1. The panel 1 is provided with horizontal slots 15 so that, when the lenses 14 are mounted against the back of the panel 1, the narrow rectangular faces protrude through the slots 15 and form the indicia 5 of FIG. 1.

As the invention is designed for testing and exercising digital equipment, it should be noted that each time unit is allotted for one pulse which may have only one of two available voltage values. Since the purpose of the indicia 5 is to indicate which one of these two voltage values is being used in the generator in each of the time intervals, only one indicia 5 in each pair should be illuminated at any one time. For example, consider the two indicia 5 at the extreme upper left corner of FIG. 1. These are both located in the "$T_0$" column and one is in the upper row 3 and the other in the lower row 4 of the top pair of rows. Of these two indicia 5, the upper one will be illuminated when one voltage value of pulse is used, and the lower one will be lighted when the other pulse voltage value is employed.

The manner in which the indicia 5 are selectively illuminated by the lamps 11 will now be explained with reference to FIG. 3. In FIG. 3, a multisource pulse generator 16 is shown to have a number of pairs of electric leads 17 extending therefrom. Each pair of leads 17 is connected to a pair of terminals 18 and 19 in a respectively different one of the toggle switches 9. In each toggle switch 9, another terminal 21 is located between the pair of terminals 18 and 19 that are connected to the generator 16. This middle terminal 21 is capable of being supplied with potential from a source 22 of voltage, such as one volt negative with respect to ground. The toggle switch 9 is equipped with another pair of terminals 23 and 24 which are connected to the electric leads 12 of one pair of the indicia 5. A sixth terminal 25 is located between this second pair of terminals 23 and 24 and is capable of being supplied with potential from a different source 26 of voltage, such as five volts negative with respect to ground.

The supply of potential from the sources 22 and 26 is controlled by the toggle switches 2. Since all of the toggle switches 2 operate in the same manner, it is sufficient to describe the operation of only one of them; namely, the toggle switch 2 that is shown in FIG. 3. This toggle switch 2 has six terminals 31–36 rranged in two groups of three. In the group at the right, the upper terminal 31 is connected to ground, the middle terminal 32 is connected to the one volt source 22, and the lower terminal 33 is connected to a long lead 37 extending to the right middle terminal 21 of the toggle switch 9.

The left group of three terminals of the toggle switch 2 has its upper terminal 34 connected to ground. Its middle terminal 35 is connected to the five volt source 26. Its lower terminal 36 is connected to a long lead 38 extending to the left middle terminal 25 of the toggle switch 9. It is to be noted that the leads 37 and 38 have a number of taps 27 and 28 which are connected to corresponding middle terminals in each of the toggle switches 9 in this particular row 8.

The toggle switches 2 and 9 have no neutral positions. Considering firstly the toggle switch 2, it is so designed that, when it is pointing down, its middle terminals 32 and 35 are connected respectively to the upper terminals 31 and 34. Under this condition, each of the voltage sources 22 and 26 is connected to ground with the result that the associated generation source in the pulse generator 16 will not be energized. Also, none of the indicia 5 in the respectively associated rows 3 and 4 can be illuminated at this time.

When the toggle switch 2 is operated so that it is pointing up, its middle terminals 32 and 35 will be connected respectively to the lower terminals 33 and 36. This serves to apply potential from the one volt source 22 to the long lead 37 extending to the right middle terminal 21 of the toggle switch 9. At the same time, potential from the five volt source 26 is supplied over the long lead 38 extending to the left middle terminal 25 of the toggle switch 9. In this manner, the toggle switch 9 is energized or activated.

The toggle switch 9, as was stated above, has no neutral position. Thus, when it is pointing up, potential from the one volt source 22 is connected to the lower terminal 19 and is applied over the lower lead 17 to the generator 16 for effecting the production of one type of pulse. At the same time, potential from the five volt source 26 is connected to the other lower terminal 24 and is supplied over the respectively associated lead 12 to the lamp 11 in the upper lens 14 thereby illuminating its indicia 5. Similarly, when the toggle switch 9 is pointing down, potential from the one volt source 22 is connected to the upper terminal 18 and is fed over the upper lead 17 to the generator 16 for effecting the production of a different type of pulse. At this time, potential from the five volt source 26 is connected to the other upper terminal 23 and is applied over the respectively associated lead 12 to the lamp 11 in the lower lens 14 thus illuminating its indicia 5. It should be noted that the ground return for the lamps 11 is provided through a metallic mounting plate. This plate has been omitted from the drawing for the purpose of simplicity and it is believed that it is sufficient to state that this plate is used for mounting and holding the lamps 11 and the lenses 14 against the back of the panel 1.

To prevent scattering of the light from each of the lamps 11 and to intensify, in effect, the illumination of the respectively associated indicia 5, each of the lenses 14 has its back and sides painted yellow. Thus, each lamp 11, is, in effect, surrounded by a yellow area except for the protruding material constituting the indicia 5. In order to prevent the light of one lamp 11 from shining through its associated lens 14 and thereby illuminating adjacent lenses 14, the yellow coating on each lens 14 is given an external coating of black paint. For purposes of simplicity, these yellow and black coatings have not been shown in the drawing. It is believed that one skilled in the art can understand how these coatings function to shield the light from each lamp 11 and to intensify the illumination of the associated indicia 5.

To summarize the operation of this embodiment of the invention as represented in FIG. 1, the operator or programmer moves the top three and the bottom toggle switches 2 to their upper positions thereby activating the respectively associated rows 8 of the toggle switches 9. This energizes certain of the lamps 11 in the respectively associated rows 3 and 4 of indicia 5 and also turns on the associated generation sources in the pulse generator 16. At the same time, the operator moves the next to the bottom toggle switch 2 to its lower position thus turning off its associated generation source in the generator 16. Since this generation source is not operating now, not any of the indicia 5 in the next to the bottom pair of rows 3 and 4 will be illuminated at this time.

The operator next manipulates the toggle switches 9 in the top row 8 for the purpose of determining the character of the pulses produced by the associated generation source. For example, as is illustrated in FIG. 1, the toggle switches 9 in the top row 8 are operated in such a manner as to produce a square wave. Specifically, the switch 9 in the "$T_0$" column is moved to its "down" position thus causing the illumination in column "$T_0$" of the indicia 5 in the lower row 4 of the top pair of rows 3 and 4. The next switch 9 in the top row 8 is operated to its "up" position thereby effecting the lighting in column "$T_1$" of the indicia 5 in the upper row 3 of the pair of rows 3 and 4. The remaining switches 9 in this top row 8 are similarly operated so as to be alternately in "down" and "up" positions with the result that they effect the illumination of their associated indicia 5 alternatively in rows 4 and 3 of the top pair. Accordingly these yellow illuminated horizontal indicia 5 combine with the vertical white indicia 7 to present a static pictorial representation of the square wave that is being repetitively produced dynamically by the associated source in the generator 16.

The switches 9 in the other rows 8 are selectively operated to produce more complex waveforms comprising pulses having different widths and different interpulse spacings as is pictorially indicated by their respectively associated illuminated indicia 5.

However, since the next to the bottom toggle switch 2 in the control column at the upper left side of the panel 1 is in its "down" or "OFF" position, the associated generation source is off and none of the associated indicia 5 will be illuminated at this time. It is to be understood that this particular generation source has been turned off simply for the purpose of explaining the versatile nature of this equipment. More than one generation source can be turned off at the same time. If desired, all of the generation sources may be turned on during the same time period thereby causing illumination of indicia 5 in all pairs of the rows 3 and 4.

In any event, the panel 1 presents the operator with a static pictorial display of the complete cycle of the particular waveform produced by each generation source in the generator 16.

Figure 4:
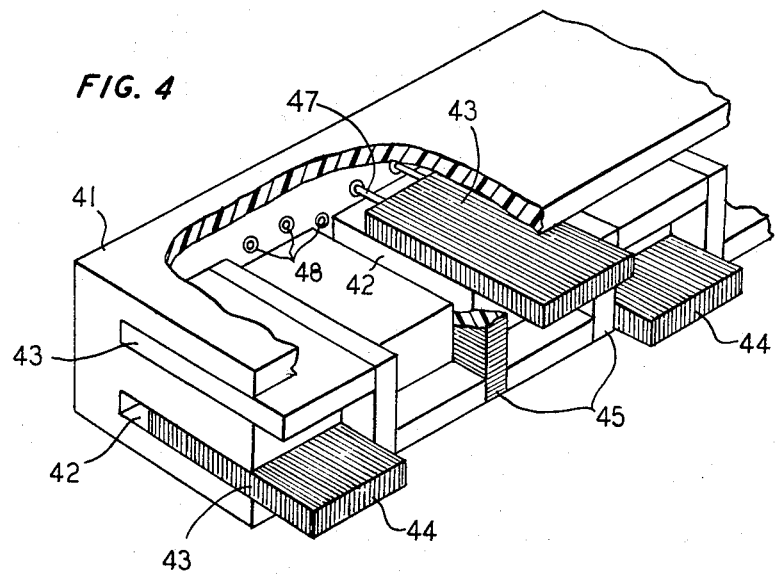
FIG. 4 is a three dimensional view of a section of a modified form of a display unit.

As was stated above, in a modified form of the display unit, both the horizontal and the vertical indicia are selectively illuminated for visually simulating the waveforms produced by the pulse generator 16. In this modified embodiment of the invention, the array of lenses 14 is replaced by rows of blocks 41 having a number of slots 42 formed therein. For purposes of simplicity, only one block 41 is shown in FIG. 4 wherein it can be seen that some of the slots 42 are arranged horizontally while other slots 42 are disposed vertically. Each of the slots 42 is adapted for receiving and holding a flat rectangular slab 43 of a suitable translucent material, such as glass or an appropriate plastic.

The blocks 41 are composed of any suitable material, such as aluminum, and they may each conveniently be made of such size as to hold two layers or rows of horizontally disposed slots 42 having interposed therebetween one row of vertically arranged slots 42 as is shown in FIG. 4. The front ends of the slabs 43 contained therein constitute horizontal indicia 44 and vertical indicia 45, respectively. As was the case with the lenses 14 of the previously described embodiment of the invention, the blocks 41 are adapted to be mounted against the back of an equivalent panel 1. However, this equivalent panel 1 is modified with respect to the slots 15. Instead of employing narrow slots 15, this modified panel utilizes wider slots so that both the horizontal indicia 44 and the vertical indicia 45 can be accommodated therein. For purposes of simplicity, this modified panel has not been shown in the drawing as it is believed that those skilled in the art can readily apprehend its nature. Thus, the front of this modified panel will resemble the panel of FIG. 1 except that the modified vertical indicia 45 have their upper and lower ends interposed between the respectively associated horizontal indicia 44.

Figure 5:
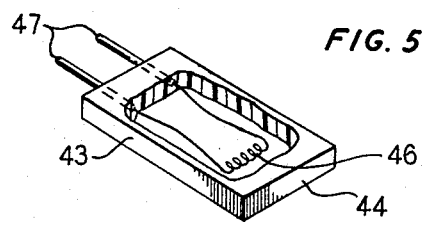
FIG. 5 is a three dimensional view of one of the horizontal pushbuttons of this modified display unit.

Although it was stated above that FIG. 5 shows one of the horizontal indicia 44, the same construction of the slab 43 is utilized for the vertical indicia 45. Thus, each of the slabs 43, whether horizontal or vertical, contains a lamp filament 46 having two electric leads 47 projecting out from the rear end of the slab 43. These leads 47, which are in the nature of pins, are adapted to be inserted into insulated sockets 48 which are formed in the back of the block 41 and are shown on an enlarged scale in FIG. 6. The lamp filaments 46 are adapted to be selectively illuminated in a manner described hereinafter for providing pictorial representations of the waveforms produced by the multisource pulse generator 16.

The specific nature of the lamp filaments 46 can be varied. For example, if the slabs 43 are made of glass, they can each be formed with a small evacuated chamber having the associated lighting filament 46 mounted therein. If the slabs 43 are made of a translucent plastic, then small lamps similar to the lamps 11, which are shown in FIG. 2, can be embedded therein. If desired, the exterior surfaces of the slabs 43 can be tinted or painted in the same manner as was described above with respect to the lenses 14. However, the front ends of the slabs 43 are maintained clear because these front ends or faces constitute the horizontal indicia 44 and the vertical indicia 45.

Figure 6:
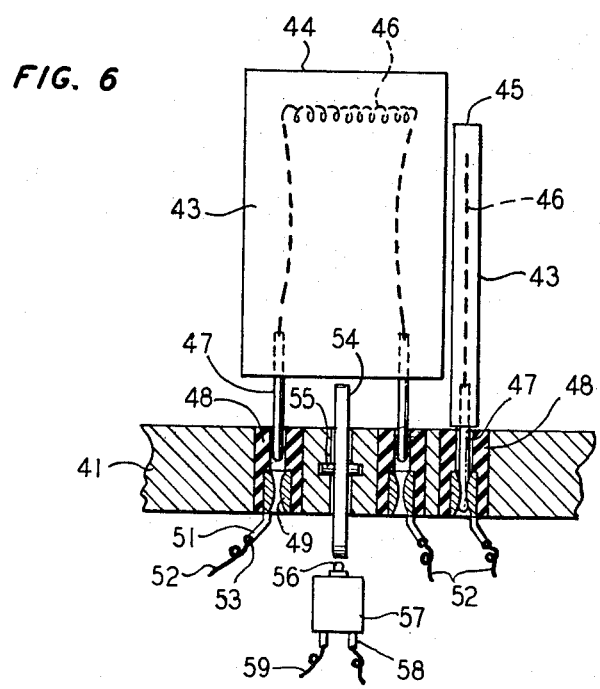
FIG. 6 is a plan view on an enlarged scale of a horizontal pushbutton and an adjacent vertical indicia slab together with associated control means for controlling the operation of the multisource pulse generator.

The vertically disposed slabs 43 are fixedly positioned in the block 41 so that, after they have been mounted, they are not moved. However, the horizontally arranged slabs 43 are adapted for limited movement in and out of their associated slots 42 so as to function in the nature of pushbuttons. This can be better understood with reference to FIG. 6 which shows, on an enlarged scale, two of the slabs 43 and their associated electric leads 47 and sockets 48. The left slab 43 is horizontally disposed while the right slab 43 is arranged vertically. It is to be noted that the vertical slab 43 is pushed completely into its associated slot 42 so that its pin leads 47 are inserted all the way into their associated sockets 48. The horizontal slab 43 is inserted only part of the way into its associated slot 42 so that it projects outward from the front of the block 41 as is represented in FIG. 4. Accordingly, its pin leads 47 are inserted only part of the way into their associated sockets 48 as is illustrated in FIG. 6.

Each of the sockets 48 comprises a hollow cylinder of a suitable insulating material, such as an appropriate plastic. The upper half of this cylinder has a central bore of such dimension as to accommodate snugly the associated pin lead 47. The lower half of this cylinder has an enlarged bore which is lined with a suitable electrically conductive metal 49. This metallic lining 49 extends out over the bottom of the socket 48 and has a portion bent outward for forming a tab 51. A respectively different electric lead 52 is attached to each of the tabs 51 by any convenient means, such as solder 53. It should be noted that the metallic lining 49 does not block the central bore through the socket 48.

Thus, the central bore through each socket 48 acts as a guide for its associated pin lead 47 during the in-out sliding movement of the associated pushbutton 43. This central bore also presents a friction surface for holding the associated pin lead 47 in whichever position it is pushed. The friction is sufficient to prevent the associated pushbutton 43 from falling out when it is not completely pushed in.

A cam 54 is positioned in a slot in the block 41 midway between the two sockets 48 which are associated with each horizontal slab 43. The cam 54 is mounted on a pivot 55 in such a manner that, when it is tilted in one direction, it actuates the pushbutton contact 56 of a microswitch 57. The switch 57 has six terminals 58 of which only two can be seen in FIG. 6. The other four terminals 58 are directly behind those that are visible. Each of these six terminals 58 has an electrical lead 59 extending therefrom.

When the horizontal slab 43 is in its extended forward position, as is represented in FIG. 6, its pin terminals 47 are inserted only part of the way into their associated sockets 48 and do not engage the metallic linings 49. Therefore, there is no electric engagement between them with the result that the associated lamp filament 46 will not be energized and the horizontal indicia 44 of this particular slab 43 will not be illuminated at this time. However, when this slab 43 is pushed in, its terminals 47 will extend all the way inside the associated sockets 48 and will make electric engagement with the metallic linings 49. Accordingly, electric energy supplied over the leads 52 will be applied to the filament 46 for illuminating the associated indicia 44.

At the time when the slab 43 was pushed in, its bottom edge struck the top edge of the cam 54 and tilted it about its pivot 55. This action will now be explained with reference to FIG. 7 which is a side view of some of the elements shown in FIG. 6. Although three terminals 58 of the microswitch 57 are shown in FIG. 7, it is to be understood that there are three other terminals 58 directly behind these because, as was stated above, the microswitch 57 has six terminals 58 each having a lead 59.

Figure 7:
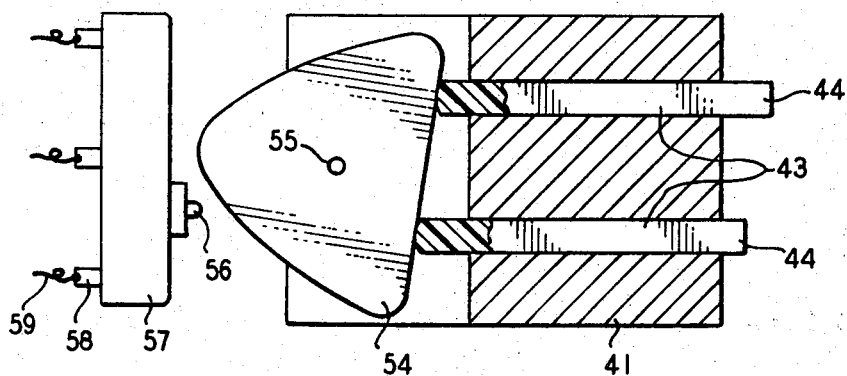
FIG. 7 is a side view of some of the elements shown in FIG. 6.

In FIG. 7, a pair of the horizontal slab pushbuttons 43 are shown with the lower one pushed in so as to tilt the cam 54 away from the contact 56 of the microswitch 57. When the upper slab pushbutton 43 is manually pushed in, its bottom portion strikes the upper shoulder of the cam 54 and rotates it about its pivot 55 in a counterclockwise direction. This causes the pointed portion of the cam 54 to strike against the contact 56 and to hold it pushed into the microswitch 57. At the same time, the lower shoulder of the cam 54 is forced against the bottom of the lower pushbutton 43 and pushes it outward.

When the lower pushbutton 43 is pushed in, the cam 54 is rotated in a clockwise direction so that its pointed portion is moved upward thereby releasing the contact 56 in the microswitch 57. At this time, the forward movement of the upper shoulder of the cam 54 pushes the upper pushbutton 43 outward. Thus, due to the mechanical linkage or control provided by the cam 54, only one of each pair of upper and lower pushbuttons 43 can be pushed in at any one time.

This mechanical linkage is also utilized to control the illumination of the vertical indicia 45 in such a manner that any one of them can be lighted only when the two adjacent pairs of horizontal pushbuttons 43 on each side thereof have diagonally oppositely disposed slabs 43 pushed in. For example, if the upper horizontal slab 43 one one side of a vertical indicia 45 is pushed in while the lower horizontal slab 43 on the opposite side is pushed in, then the vertical indicia 45 will be illuminated. However, if both the lower horizontal slabs 43 on each side of a vertical indicia 45 are pushed in, then this vertical indicia 45 will not be lighted.

Figure 8:
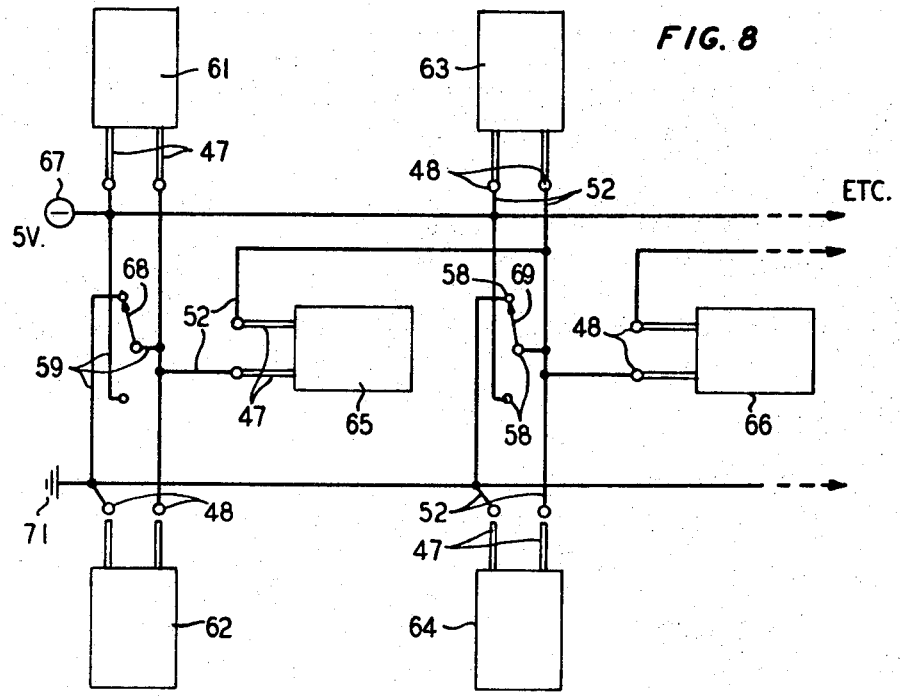
FIG. 8 is a schematic diagram of the electric circuits for selectively controlling the illumination of the vertical indicia in the modified display unit shown in FIG. 4.

This can be better understood by refering to FIG. 8 which shows at the left a pair of horizontally disposed slab pushbuttons 61 and 62 with the pushbutton 61 being located above the pushbutton 62. Toward the right of these, there is another pair of horizontal pushbuttons 63 and 64 having the pushbutton 63 positioned above the pushbutton 64. Interposed between these horizontal pushbuttons 61–64 is a vertically disposed slab 65. To the right of this, there is another vertically disposed slab 66 which is interposed between the pair of horizontal pushbuttons 63 and 64 and a pair of horizontal pushbuttons which are to be understood as being located at the right of this vertical slab 66. This last-mentioned pair of horizontal pushbuttons has been omitted from the drawing for the purpose of simplicity.

Each of the slabs 61–66 has a pair of lamp-energizing pin leads 47 which are the same as those shown previously in the drawing. These pin leads 47 are adapted to be inserted into sockets 48. As was described above, the vertical slabs 65 and 66 normally have their leads 47 completely inserted into the associated sockets 48. Due to the mechanical control provided by the cams 54, as was explained above, only one of each pair of upper and lower horizontal pushbuttons 61–62, 63–64, can have their leads 47 pushed completely into their associated sockets 48 at any one time.

As was described in connection with FIG. 6, each socket 48 has a tab 51 to which an electric lead 52 is connected. A source 67 of electric potential, such as five volts negative with respect to ground, is connected to one composite lead 52, 47 of each of the upper pushbuttons 61 and 63. This source 67 corresponds to the five volt source 26 shown in FIG. 3 because they each perform the same function; namely, providing electric energy for lighting the horizontal indicia 5, 44.

The left upper pushbutton 61 has its other composite lead 47, 52 connected to a movable arm 68. Similarly, the right upper pushbutton 63 has its other composite lead 47, 52 connected to another movable arm 69. Each movable arm 68, 69 has associated therewith an upper and a lower contact as is indicated in FIG. 8. Each set of these contacts with the associated arms 68, 69 are parts of a respectively different one of the microswitches 57 shown in FIGS. 6 and 7.

Each microswitch 57 is so designed that, when its associated cam 54 pushes against the contact 56 of the microswitch 57, the arm 68 or 69 will engage its upper contact. This completes circuit means for lighting the indicia 44 of the respectively associated pushbutton. For example, the upper left pushbutton 61 is shown in FIG. 8 to be completely pushed in. This movement of the pushbutton 61 tilts the cam 54 to effect the pushing in of the microswitch contact 56, as was described above, thereby causing the arm 68 to engage its upper contact. This closes an electric path from ground 71 to the upper contact and arm 68, up through the right lead 47 of pushbutton 61, and then out through the left lead 47 to the five volt source 67. This serves to energize the associated lamp filament 46 thereby lighting the indicia 44 of this pushbutton 61. When the upper right pushbutton 63 is completely pushed in, a similar electric circuit through its associated arm 69 will cause its indicia 44 to be illuminated.

Assuming that both of the upper pushbuttons 61 and 63 are completely pushed in, as is shown in FIG 8, then the interposed vertical slab 65 will not be lighted. This is because its lower lead 47 is connected over the arm 68 to ground 71 while, at the same time, its upper lead 47 is connected over the arm 69 to ground 71. Thus, when adjacent pushbuttons in the same horizontal layer are illuminated, the interposed vertical slab will not be lighted.

Let it now be assumed that the lower left pushbutton 62 is completely pushed in thereby forcing the upper left pushbutton 61 outward and terminating the lighting of its indicia 44. This movement causes the associated cam 54 to tilt to the position shown in FIG. 7 thereby releasing the microswitch contact 56. As was explained above, this causes the arm 68 to engage its lower contact. An electric path is now closed from ground 71 through the left lead 47 of the pushbutton 62, out over the right lead 47, over the arm 68 and lower contact, and then up to the five volt source 67. This now causes the indica 44 of the pushbutton 62 to become illuminated. A similar electric path will be available for lighting the lower right pushbutton 64 when it is completely pushed in.

When a situation occurs in which the pairs of horizontal pushbuttons on each side of a vertical slab have diagonally opposed slabs pushed in, then the indicia 45 on the vertical slab will be illuminated. An example of such a condition is where the lower left pushbutton 62 and the upper right pushbutton 63 are both pushed all the way in thereby lighting their indicia 44. Under this condition, an electric path is closed from ground 71 to the upper contact and arm 69, over the upper leads 52 and 47 of the vertical slab 65, out over the lower leads 47 and 52 to the arm 68 and its lower contact, and then up to the five volt source 67. Accordingly, the lamp filament 46 in the vertical slab 65 will be energized to light the associated indica 45. A similar lighting circuit will be closed if the upper left pushbutton 61 and the lower right pushbutton 64 are pushed completely in.

Thus, any one of the vertical slabs will be lighted when a pushed-in horizontal slab on one side thereof is in a different layer or row than a pushed-in horizontal slab on the opposite side thereof. In other words, the lighting of a horizontal indicia 44 in one layer or row will, when combined with the lighting of a horizontal indicia 44 in a different layer or row in an adjacent column, effect the lighting of the interposed vertical indicia 45.

It is to be understood that the availability of potential from the five volt source can, if desired, be controlled by employing "ON-OFF" toggle switches similar to the toggle switches 2 that are shown in FIGS. 1 and 3.

It was stated above that each pair of upper and lower pushbuttons engages a respectively different microswitch 57, and that each of the microswitches 57 has six terminals 58 with each terminal 58 having an electric lead 59 extending therefrom. It was also stated above, that the movable arms 68, 69 and their associated upper and lower contacts are parts of respectively different microswitches 57. On this basis, it is to be understood that, for example, in the case of the microswitch 57 associated with the pair of pushbuttons 61 and 62, one lead 59 is connected to a terminal 58 to which the arm 68 is connected. A second lead 59 is connected to a terminal 58 associated with the lower contact. A third lead 59 is connected to a terminal 58 associated with the upper contact.

The remaining three terminals 58 in each microswitch 57 correspond, in effect, to the terminals 18, 19, and 21 in the toggle switch 9 shown in FIG. 3. In other words, they are part of the circuits used for controlling the type of pulses produced by a multisource pulse generator. The three leads 59 connected to these terminals 58 correspond, in effect, to the lead 37 and the upper and lower leads 17 shown in FIG. 3.

Specifically, a source of potential, such as one volt negative with respect to ground, is applied by any suitable means, such as the "ON-OFF" toggle switches 2 shown in FIGS. 1 and 3, to one of the leads 59 which therefore is similar to the lead 37. This lead 59 is connected to a terminal 58, like the terminal 21, which is connected to a movable arm corresponding to the arms 68 and 69. Two other leads 59, like the leads 17 in FIG. 3, are connected to a generation source in a multisource pulse generator similar to the generator 16. One of these two leads 59 is connected to a terminal 58, like the terminal 18, associated with an upper contact, and the other is connected to a terminal 58, like the terminal 19, associated with a lower contact.

Accordingly, when the associated cam 54 is in one position, the movable arm will engage its upper contact to effect the application of electric energy from one volt source to one of the leads 59 extending to the generator 16 for effecting the production of one type of pulse. When the cam is in its other position, the arm in the microswitch will move to engage its lower contact. This will cause potential from the one volt source to be applied to the other one of the pair of leads 59 that are connected to the generator 16 thereby effecting the generation of a different type of pulse. Thus, the type of pulses produced by this multisource pulse generator is controlled by circuits that are essentially similar to those used for controlling the generator 16 shown in FIG. 3.

What is claimed is:

1. A display unit for providing a visual representation of an electric wave composed of a series of two different types of pulses,
    said display units having control means adapted for effecting selective control of the sequential appearance of said two types of pulses in said electric wave,
    said display unit also comprising a panel having a first row of horizontally disposed indicia each representing one type of pulse,
    a second row of horizontally disposed indicia each representing the other type of pulse,
    a row of vertically disposed indicia interposed between said first and second rows,
    and said control means being further adapted for effecting the selective illumination of certain horizontal indicia in said first and second rows in accordance with the sequential appearance of said two types of pulses in said electric wave whereby said illuminated horizontal indicia cooperate with at least some of said vertical indicia for forming a visual representation of said electric wave.

2. A display unit in accordance with claim 1 wherein all of said horizontal and vertical indicia have narrow rectangular shapes,
    and wherein each of said vertical rectangles is located adjacent to the point of division between a respectively different pair of adjacent horizontal rectangles.

3. A display unit in accordance with claim 1 wherein said panel has means defining a long narrow slot in each of said rows,
    wherein each of said horizontally disposed indicia is in the shape of a block having a projecting narrow rectangular face,
    each of said blocks being adapted to be mounted against the back of said panel with its face protruding through one of said slots,
    and wherein each of said vertically disposed indicia is in the shape of a narrow rectangle located on the front of said panel and extending from an edge of one of said slots to an edge of the other of said slots.

4. A display unit in accordance with claim 1 wherein said horizontal indicia are also disposed in a number of columns with each column containing only one indicia in said first row and only one indicia in said second row,
    and wherein said control means include instrumentalities for limiting the illumination of said horizontal indicia of said two rows to only one indicia in any one column at any one time.

5. A display unit in accordance with claim 1 wherein said horizontal indicia are also disposed in a number of columns with each column containing only one respectively different indicia from each of said rows of horizontally disposed indicia,
    and wherein said control means comprise a horizontally disposed series of control switches,
    each of said switches being mounted on the front of said panel under a respectively different one of said columns.

6. A dispaly unit in accordance with claim 1 and further comprising second control means adapted for selectively effecting the starting and stopping of said electric wave and for effecting the corresponding initiation and termination of said indicia illumination,
    said second control means comprising a control switch mounted on the front of said panel at a point adjacent to the beginning of said interposed row.

7. A display unit for providing illuminated pictorial representations of an electric wave composed of a series of two different types of pulses,
    said display unit having control means adapted for effecting selective control of the sequential appearance of said two types of pulses in said electric wave,
    said display unit also comprising a panel having a first row of horizontally disposed indicia each representing one type of pulse, a second row of horizontally disposed indicia each representing the other type of pulse, a row of vertically disposed indicia interposed between said first and second rows, said control means being further adapted for effecting the selective illumination of certain horizontal indicia in said first and second rows in accordance with the sequential appearance of said two types of pulses in said electric wave, and said control means being additionally adapted for selectively effecting the illumination of at least some of said vertical indicia whereby said illuminated horizontal indicia cooperate with said illuminated vertical indicia for forming an illumination pictorial representation of said electric wave.

8. A display unit in accordance with claim 7 wherein each of said horizontal indicia is constituted by a narrow rectangular end of a horizontally disposed slab, wherein each of said vertical indicia is constituted by a narrow end of a vertically disposed slab, each of said vertically disposed slabs having its upper portion positioned between a respectively different pair of adjacent horizontally disposed slabs in one row and having its lower portion located between a respectively different pair of adjacent horizontally disposed slabs in the other row, and means disposed inside each of said slabs and adapted for illuminating the indicia end thereof.

9. A dispaly unit in accordance with claim 8 and further comprising means for supporting each of said horizontally disposed slabs for limited in-and-out sliding movement in the same manner as a pushbutton, said horizontally disposed slabs being located in a number of columns with each column containing only one respectively different indicia from each of said rows of horizontally disposed slabs, said control means including a plurality of switches each having two alternative operating positions, and means for mounting each switch behind a respectively different pair of horizontally disposed slabs for operation by the in-and-out movement thereof, each of said pairs consisting of horizontally disposed slabs in the same column but in different rows.

10. A display unit in accordance with claim 9 wherein the pushing-in of a first one of the horizontally disposed slabs in any one of said pairs is adapted to move its respectively associated switch to the first of its two operating positions while pushing-out the second one of the horizontally disposed slabs in this pair, wherein the pushing-in of said second slab is adapted to move said switch to the second of its operating positions while pushing-out said first slab, and instrumentalities responsive to the movement of any one of said switches to any one of its positions for effecting the illumination of the indicia end of the respectively associated pushed-in horizontally disposed slab whereby only one of each pair of horizontal indicia in each of said columns is illuminated at any one time.

11. A display unit in accordance with claim 10 and further comprising additional control means for selectively effecting the illumination of said vertically disposed indicia, said additional control means being adapted to effect the illumination of any one of said vertical indicia only in response to the pushing-in of a horizontally disposed slab in one row of an adjacent column and the pushing-in of a horizontally disposed slab in a different row in another adjacent column.

12. A display unit for providing visual static representations of a plurality of electric waves dynamically generated repetitively by a multisource pulse generator, each of said electric waves being composed of a series of two different types of pulses with the sequential order of said pulses being different in at least some of said waves and the number of pulses being the same in each of said waves, said display unit comprising a plurality of control means for controlling the sequential order of said two types of pulses in each of said electric waves, said display unit also including a panel having horizontally disposed indicia mounted thereon in a number of parallel rows with said rows being grouped in pairs, said indicia also being mounted in a number of parallel columns with each column containing only one respectively different indicia from each of said rows, the number of said pairs of rows being the same as the number of wave sources in said pulse generator and the number of said columns being the same as the number of pulses in each of said electric waves, said panel also having vertically disposed indicia mounted thereon in a number of parallel rows with each row being interposed between the two rows of a respectively different one of said pairs of rows, and said vertical indicia being positioned on said panel along imaginary lines defining the boundary lines of said columns.

13. A display unit in accordance with claim 12 wherein said display unit further comprises a plurality of instrumentalities for effecting the illumination selectively of said horizontal indicia in each pair of said rows in accordance with the sequential order of said two types of pulses in a respectively different one of said electric waves whereby said illuminated indicia in each pair of said rows cooperate with at least some of the vertical indicia in the respectively associated one of said interposed rows for creating visual static representations of said dynamically generated electric waves.

14. A display unit in accordance with claim 12 wherein said display unit further comprises a first plurality of instrumentalities for effecting the illumination of certain of said horizontal indicia in each pair of said rows in accordance with the sequential order of said two types of pulses in a respectively different one of said electric waves, and a second plurality of instrumentalities for effecting the illumination of certain said vertical indicia in each of said rows in accordance with changes from one type of pulse to the other type of pulse in a respectively different one of said electric waves whereby said illuminated horizontal indicia in each of said pairs of rows cooperate with said illuminated vertical indicia in the respectively associated interposed rows for forming illuminated static pictorial representations of said dynamically generated electric waves.

References Cited

UNITED STATES PATENTS

| | | | |
|---|---|---|---|
| 262,419 | 8/1882 | Irwin | 340—337 |
| 1,222,091 | 4/1917 | Fricke | 340—337 |
| 1,231,821 | 7/1917 | Walton | 340—337 |
| 1,793,767 | 2/1931 | Whitcomb. | |
| 2,254,643 | 9/1941 | Clehm | 340—225 |
| 2,417,043 | 3/1947 | Blewett et al. | 340—225 |
| 2,817,815 | 12/1957 | Evans. | |

JOHN W. CALDWELL, *Primary Examiner.*

D. L. TRAFTON, *Assistant Examiner.*